F. DOREE.
BAR TRAP NEST.
APPLICATION FILED JULY 8, 1913.
1,168,178.
Patented Jan. 11, 1916.
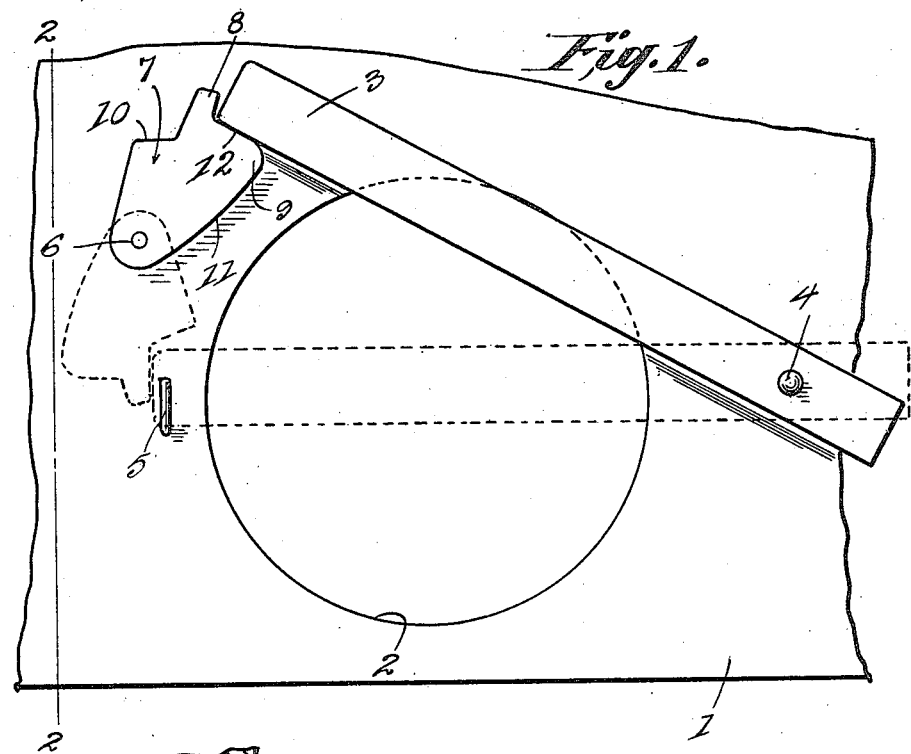
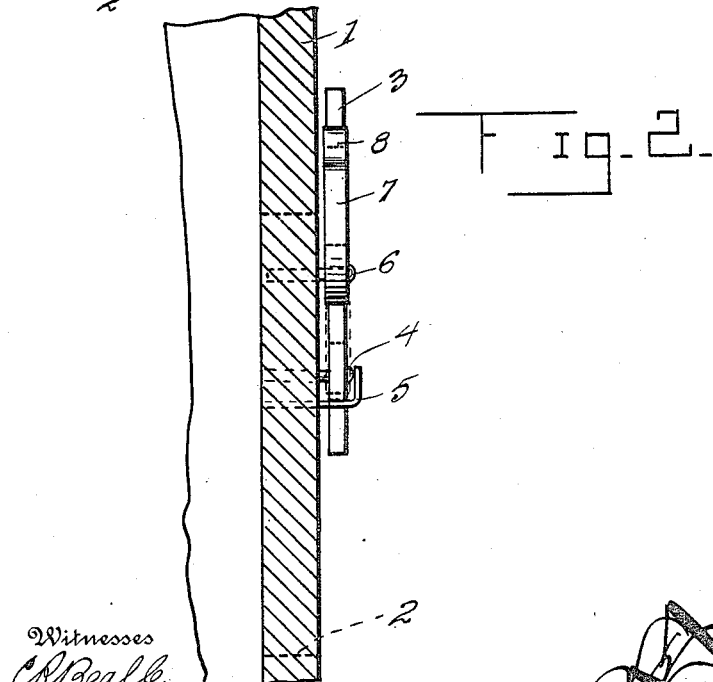
Witnesses
CF Beall
CF Landon
Inventor
F. Doree.

UNITED STATES PATENT OFFICE.

FREDERICK DOREE, OF REX, OREGON.

BAR TRAP-NEST.

1,168,178.     Specification of Letters Patent.     Patented Jan. 11, 1916.

Application filed July 8, 1913. Serial No. 777,940.

*To all whom it may concern:*

Be it known that I, FREDERICK DOREE, a citizen of the United States, residing at Rex, in the county of Yamhill and State of Oregon, have invented certain new and useful Improvements in Bar Trap-Nests; and I do hereby declare the following to be a full, clear, and exact description of the invention, such as will enable others skilled in the art to which it appertains to make and use the same.

This invention relates to new and useful improvements in trap nests and as its principal object, contemplates the provision of a trap door which may be quickly and readily applied to any packing box or similar and suitable receptacle.

It is a well known fact that trap nests are much in demand by poultry raisers but for the most part, the inventions heretofore conceived have been too complicated and cumbersome to permit of general utilization.

A further object of this invention is therefore to provide, as above stated, a door attachment which in itself forms a complete trap in that it will permit the entrance into the nest but will not permit the exit of the fowl from the nest.

A still further object is to provide a gravity pawl for holding the trap bar in raised or open position and for automatically locking the bar in closed position after the entrance of the fowl into the nest.

The above and additional objects are accomplished by such means as are illustrated in the accompanying drawings, described in the following specification, and then more particularly pointed out in the claims which are appended hereto and form a part of this invention.

With reference to the drawings wherein I have illustrated the preferred embodiment of my invention as it is reduced to practice, and throughout the several views of which similar reference numerals designate corresponding parts, Figure 1 is a side elevation illustrating the bar in open position. In this figure the dotted lines indicate the closed position of the latch and bar, and, Fig. 2 is a section on the line 2—2 of Fig. 1.

Proceeding now to the description of the drawings, the numeral 1 designates the door of this invention, which is formed of a rectangular piece of wood or other suitable and similar material, and may be made in any convenient and desired sizes to permit its application to the ordinary packing box or similar receptacle. In practice, the member 1 is provided with an opening 2 through which the fowl may enter the nest. This opening is circular in the preferred embodiment and may be arranged at any desired point in the member 1. It has been found most efficient to form the opening centrally of the door. As a means for preventing the exit of the fowl from the nest, there has been provided a trap bar 3 which consists essentially in an elongated wooden or metallic bar pivoted, as at 4, at one side of the opening 2 and in the plane of the horizontal diameter thereof. When in closed position, the member 3 is supported in a horizontal position by an L-shaped screw keeper member 5 which is disposed at opposite sides of the opening 2 from the pivot 4, and is arranged to engage the free end of the bar 3 when this latter member swings downwardly into a horizontal position after being released by a fowl entering the nest.

As a means for supporting the bar 3 in open or raised position and for locking it in closed position, this invention employs a gravity pawl which is pivoted on the outer face of the door, as at 6, and designated as an entirety in Fig. 1 by the numeral 7. This pawl 7 is formed with a tongue 8, a lobe 9, and a shoulder 10. The lobe 9 is provided for the purpose of throwing the center of gravity of the pawl between the curved edge 11 of the lobe and a line drawn from the pivot point 6 through the tongue 8. It will be apparent that by thus forming the pawl 7, it may be swung on its pivot point to hold the member 3 in raised position by the engagement of the tongue 8 and shoulder 12 with the free end of the member 3. It will be observed that when the bar is in raised position, the tongue 8 will bear against the end of the bar by reason of the weight of the lobe 9. In raised position, the upper longitudinal edge of the member 3 is approximately tangent to the edge of the opening 2 so that as the fowl enters it will strike the lower edge of the bar 3, raising the bar upwardly until the lower edge is tangent with the edge of the circular opening 2. This movement of the bar 3 will be sufficient to disengage it from the pawl 7 and the pawl will then swing downwardly on its pivot point. As soon as the hen is completely within the nest, the bar 3 will, of course, swing downwardly and the free end will engage the pawl 7, swinging it upwardly in a clockwise direction. As soon as the free end of the bar reaches a horizontal position it lodges in the keeper 5. By reference to the dotted lines in Fig. 1, it will be observed that the pawl 7 acts to hold the bar 3 against return upward movement by the engagement of the shoulder 10 and tongue 8 with the free end of the bar. In this connection it is to be observed that by proportioning the pawl so that its center of gravity lies between the curved edge 11 and a line drawn through the tongue 8 and pivot point 6, the tongue 8 will bear at all times against the free end of the member 3, thus holding the shoulder 10 in the desired position.

In practice it has been found that it is most desirable to construct the device of this invention of light hard wood so that it may be cheaply manufactured, and may be shipped from various points without the payment of an excessive postage or freight rate.

In reduction to practice, I have found that the form of my invention illustrated in the drawings and referred to in the above description as the preferred embodiment, is the most efficient and practical; yet realizing that the conditions concurrent with the adoption of my device will necessarily vary, I desire to emphasize the fact that various minor changes in details of construction, proportion, and arrangement of parts may be resorted to, when required, without sacrificing any of the advantages of my invention as defined in the appended claim.

Having thus described my invention, I claim:—

The combination with a fowl nest including a front wall having an entrance and exit opening therein, a guard pivoted to the front wall at the side of the opening and a keeper carried on the opposite side of the opening to support the guard in operative position, of a pawl pivoted at one end to said wall at a point above the keeper and a tongue projecting from the free end of the pawl, arranged to engage the free end of the guard when the latter is in operative and inoperative position and being disposed between the sides of the pawl, said pawl having locking and supporting shoulders on the free end and on opposite sides thereof, and inoperative position and being disposed outwardly beyond the locking shoulder and engaging the guard on the under face thereof, when the guard is in inoperative position, said locking shoulder engaging the upper face of the guard when the latter is in operative position.

In testimony whereof I affix my signature in presence of two witnesses.

FRED DOREE.

Witnesses:
 FRANK DOREE,
 FLORENCE DOREE.

Copies of this patent may be obtained for five cents each, by addressing the "Commissioner of Patents, Washington, D. C."